United States Patent [19]

Inoue et al.

[11] 4,216,753
[45] Aug. 12, 1980

[54] FUEL AIR MIXTURE SUPPLY SYSTEM FOR USE IN FUEL-INJECTION-TYPE INTERNAL COMBUSTION ENGINE

[75] Inventors: Tokuta Inoue, Mishima; Takatoshi Masui; Masaki Mitsuyasu, both of Susono; Shigetaka Takada; Masayuki Okamura, both of Obu, all of Japan

[73] Assignees: Yoyota Jidosha Kogyo Kabushiki Kaisha, Toyota; Aisan Kogyo Kabushiki Kaisha, Obu, both of Japan

[21] Appl. No.: 940,366

[22] Filed: Sep. 7, 1978

[30] Foreign Application Priority Data

Dec. 14, 1977 [JP] Japan .................................. 52-151041

[51] Int. Cl.² .......................... F02M 39/00; B05B 7/04
[52] U.S. Cl. .................................... 123/445; 123/472; 123/531; 261/118; 261/DIG. 39; 239/405
[58] Field of Search ............ 123/139 AW, 32 G, 32 F, 123/33 R, 33 E; 261/DIG. 39, DIG. 74, 115, 118; 239/403, 405

[56] References Cited

U.S. PATENT DOCUMENTS

| 3,782,639 | 1/1974 | Boltz et al. ................. | 123/139 AW |
| 3,861,366 | 1/1975 | Masaki et al. ............... | 123/139 AW |
| 3,931,814 | 1/1976 | Rivere ....................... | 123/139 AW |
| 4,006,719 | 2/1977 | Kanda et al. ................ | 123/33 E |
| 4,044,077 | 8/1977 | Gupta et al. ................ | 261/DIG. 39 |

*Primary Examiner*—Ira S. Lazarus
*Assistant Examiner*—Magdalen Moy
*Attorney, Agent, or Firm*—Stevens, Davis, Miller & Mosher

[57] ABSTRACT

A fuel-air mixture supply system comprising a Venturi portion formed on the inner surface of a cylindrical suction system having a throttle valve therein, at least one fuel injection port provided in the Venturi portion and open into the suction system, an atomizing chamber located adjacently to the fuel injection port in a co-axial manner to the fuel injection port and having a nozzle to make the atomizing chamber communicate with the fuel injection port, a fuel injection valve connected to the cylindrical suction system to inject the fuel into the atomizing chamber at a predetermined pressure and an air bleed passage making the portion above the throttle valve in the suction system communicate with the atomizing chamber. The fuel injected into the atomizing chamber from the fuel injection valve is atomized by the air drawn into the chamber from the suction system through the air bleed passage. The atomized fuel is drawn into the suction system by the air flowing on the Venturi portion and is distributed in the suction system.

3 Claims, 12 Drawing Figures

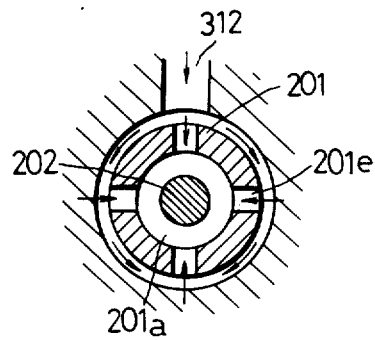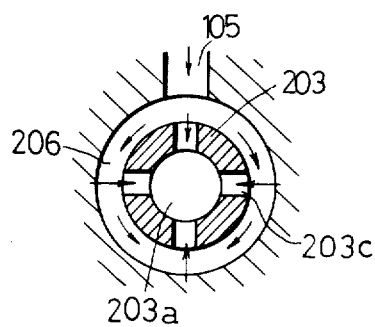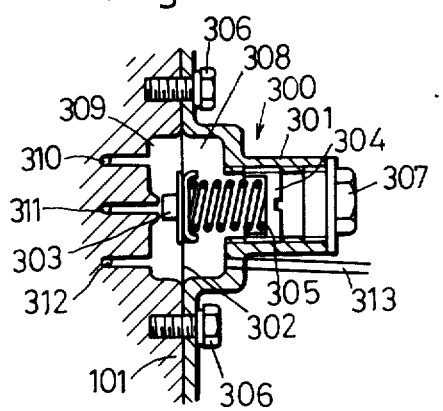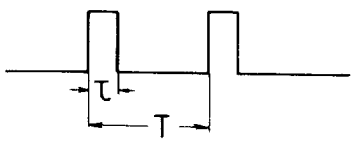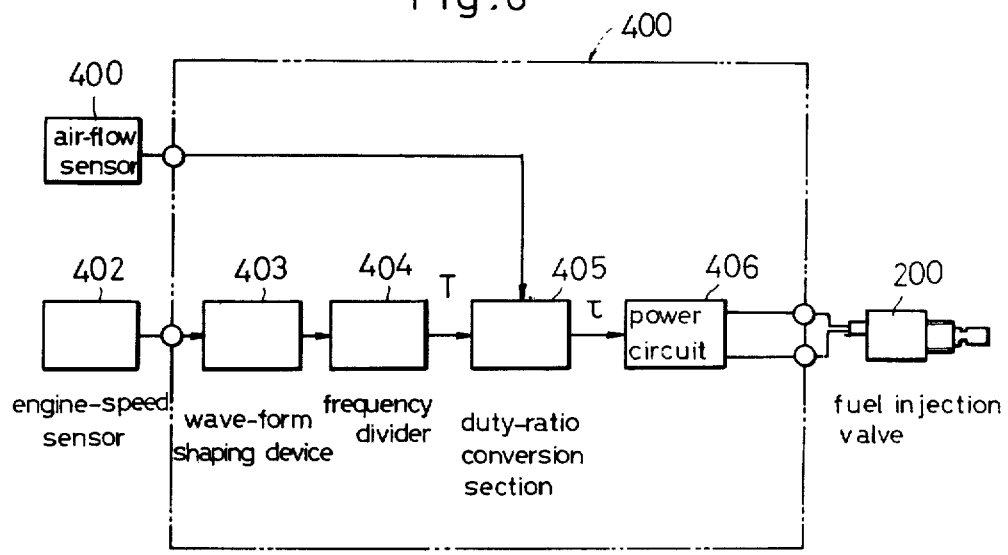

FUEL AIR MIXTURE SUPPLY SYSTEM FOR USE IN FUEL-INJECTION-TYPE INTERNAL COMBUSTION ENGINE

The carburetor conventionally used in the engine of a motor vehicle has had such problems as the flattening of the fuel-air ratio throughout all loading conditions of the engine, difficulty in manufacture at low cost, problems in connection with the atomization of the fuel and distribution of the fuel-air mixture to the cylinders. As means both for solving these problems and for purifying the exhaust gas, electronic fuel injection systems (hereinafter referred to as "EFI") have come into recent use for the engines of motor vehicles. The EFI is such system as is adapted to measure the amount of air drawn into the engine and inject into the intake ports the fuel in such amount as makes the predetermined fuel-air ratio and of the predetermined pressure from the fuel injection valves. However, the use of the EFI in the engine has required the provision of a fuel injection valve for each of the cylinders, with the result that the manufacturing cost of the engine with EFI is higher than that of the conventional engine with a carburetor. Thus, there has been desired the provision of such engine as has an EFI and a smaller number of fuel injection valves than in the conventional art.

An object of this invention is to provide a fuel-air mixture supply system for use in the internal combustion engine with a plurality of cylinders and an EFI which is capable of supplying the same amount of fuel-air mixture of the same fuel-air ratio into each cylinder without the provision of a fuel injection valve for each of the cylinders.

Another object of this invention is to provide a fuel-air mixture supply system which is superior to the engine with an EFI in conventional use in fuel atomizing capacity.

Still another object of this invention is to provide an EFI engine which has a smaller number of fuel injection valves than the conventional EFI engine and costs less than the latter to manufacture.

Further objects and advantages of this invention will become apparent from the following description and accompanying drawings, wherein:

FIG. 4 is a cross sectional view taken on line IV—IV in FIG. 3.

FIG. 5 is a cross sectional view taken on line V—V in FIG. 3.

FIG. 6 is vertical sectional view of a constant-pressure maintaining means used for a fuel injection valve of the supply system shown in FIG. 1.

FIG. 7 shows the wave form representing the operation of the fuel injection valve of the supply system shown in FIG. 1.

FIG. 8 is block diagram of a fuel control circuit used for the supply system of FIG. 1.

Figure 1:
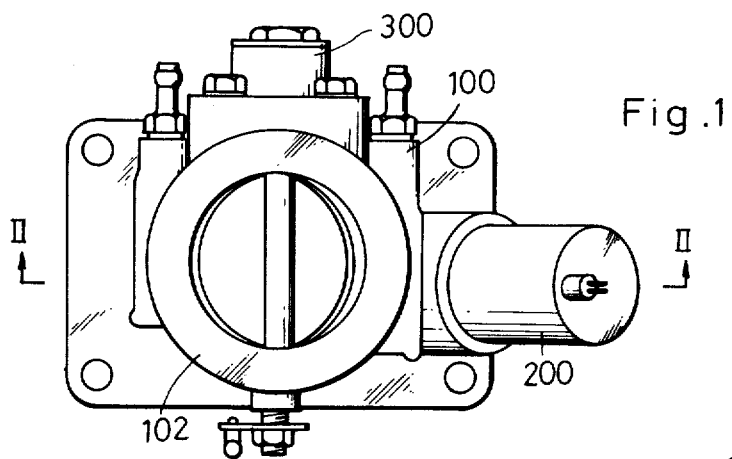
FIG. 1 is a plan view of a fuel-air mixture supply system according to one embodiment of this invention.
Figure 2:
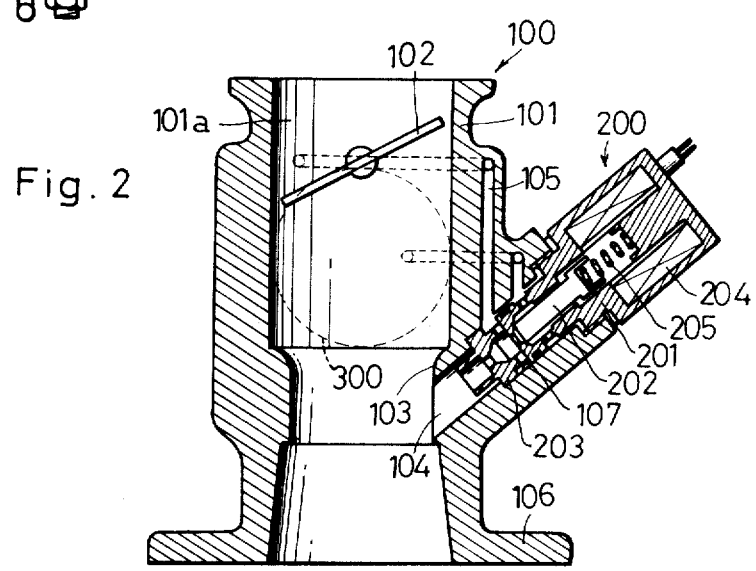
FIG. 2 is a cross sectional view of the supply system shown in FIG. 1, taken on line II—II.

Referring now to the drawings, FIGS. 1 and 2 illustrate a fuel-air-mixture supply system according to this invention which comprises a body 100 and a fuel injection valve 200. The body 100, forming a part of the suction system of the engine in a motor vehicle, comprises a suction cylinder 101 drawing air from above, a throttle valve 102 provided within the suction cylinder 101 at the upper portion of the latter, a Venturi portion 103 formed on the inner surface of the body 100 below the throttle valve 102, a fuel injection port 104 formed in the Venturi portion 103 in an upwardly oblique and straight manner and an air bleed passage 105. Numeral 101a designates the bore of the suction cylinder 101. The air bleed passage 105 allows a communication between an atomizing chamber 203a (FIG. 3) in a nozzle member 203 adjacent to the fuel injection port 104 and the upper portion of the bore 101a of the suction cylinder 101, which upper portion is defined by the throttle valve 102 at its lower boundary. The lower end of the suction cylinder 101 is open and has a flange 106 to which means, such as intake manifold (not shown) is attached. The upper end of the suction cylinder 101 is connected to an air cleaner (not shown) through a housing (not shown) for an air flow neter (not shown).

Figure 3:
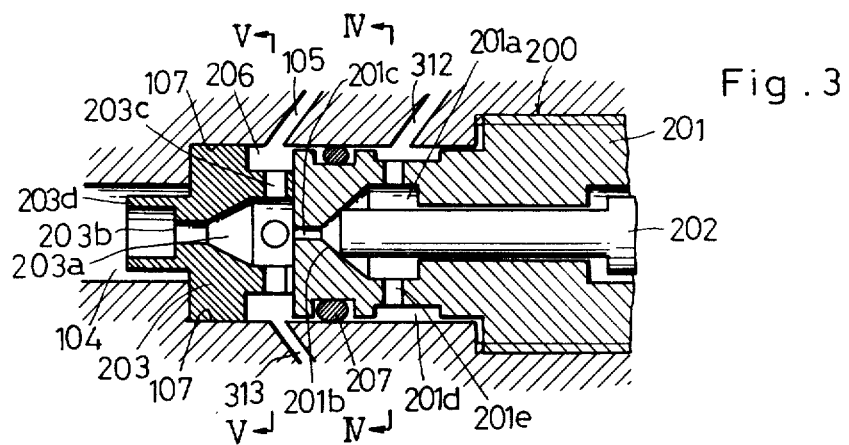
FIG. 3 is a vertical sectional view of the principal portion of the supply system shown in FIG. 1.

The fuel injection valve 200 comprises a casing 201, a plunger 202 provided within the casing 201 so as to be able to travel within the casing 201, a nozzle member 203 in contact with the forward end (i.e., the left end in FIG. 3) of the casing 201, a solenoid 204 in the casing 201 and a spring 205 urging the plunger 202 toward the fuel injection port 104. The casing 201 and nozzle member 203 are provided in an oil-tight manner within a cavity 107 which is adjacent to the fuel injection port 104, having the same axis as the injection port 104, a larger diameter than the injection port 104 and shoulder portions. As shown in FIG. 3, the nozzle member 203 has the atomizing chamber 203a with a nozzle 203b providing the outlet of the chamber 203a. The rear portion (i.e., right portion in FIG. 3) of the nozzle member 203 is a reduced-diameter portion which allows the presence of an annular air chamber 206 in contact with the front end of the casing 201. As clearly shown in FIG. 5, the nozzle member 203 is also provided with four radially arranged air holes 203c which make it possible for the air chamber 206 and atomizing chamber 203a to communicate with each other. FIG. 3 shows only two of the air holes 203c. Numeral 203d designates a cylindrical guide portion also formed at the nozzle member 203 at its front part to prevent the atomized fuel injected from the nozzle 203d from spreading in radial direction.

The casing 201 has a fuel holding section 201a of circular section and a nozzle 201c. When the fuel injection valve 200 operates, i.e., the plunger 202 moves backwardly (to the right in FIG. 3), the fuel holding section 201a and nozzle 201c communicate with each other. The nozzle 201c communicates with the atomizing chamber 203a of the nozzle member 203. A portion of the circumference of the casing 201 has an annular groove 201d. The casing 201 also has fuel holes 201e which allow communication between the annular groove 201d and fuel holding section 201a. Numeral 207 designates an O-ring. As shown in FIG. 3, the plunger 202 projects into the fuel holding section 201a at its forward portion.

Referring again to FIG. 1 and particularly to FIG. 6, a constant-pressure maintaining means 300 is attached to the suction cylinder 101. As shown in FIG. 6, this maintaining means 300 comprises a casing 301 attached to the suction cylinder 101 by means of screws 306, a diaphragm 302, a valve member 303 attached to the diaphragm 302, a pressure regulating screw 304 provided within the casing 301 and a spring 305 positioned between the diaphragm 302 and the pressure regulating screw 304. Numeral 307 designates a plug attached to the casing 301. The space within the casing 301, or one surrounded by the casing 301, diaphragm 302 and plug 307 is a pressure regulating chamber 308 which communicates with the air chamber 206 within the fuel injection valve 200 by way of a passage 313 in order to keep constant the fuel pressure at the nozzle 201c of the fuel injection valve 200 so that the fuel-air ratio is maintained constant. It may be, however, that the communication of the passage 313 with the air chamber 206 renders the structure around the nozzle member 203 complicated, resulting in a portion of the fuel injected into the atomizing chamber 203a leaking in the pressure regulating chamber 308. Therefore, the pressure regulating chamber 308 may be made, in actual practice, to communicate with the intake manifold of the engine not by way of the passage 313, but through a negative pressure conduit differently made from the passage 313.

As shown in FIG. 6, the diaphragm 302 of the maintaining means 300 divides two chambers, that is, the pressure regulating chamber 308 and a fuel chamber 309. This fuel chamber 309 is a cavity formed in the suction cylinder 101 oppositely to the pressure regulating chamber 308. Numeral 310 designates a fuel inlet through which the fuel comes into the fuel chamber 309 from a fuel pump (not shown). Numeral 311 designates a fuel outlet which is opened and closed by the valve member 303 attached to the diaphragm 302 and through which the fuel returns to a fuel tank (not shown) from the fuel chamber 309. Numeral 312 also designates a fuel outlet through which the fuel flows into the annular groove 201d of the casing 201 in the fuel injection valve 200. Discharged from the fuel pump, the fuel flows into the fuel chamber 309 through the fuel inlet 310 and the fuel pressure is regulated to the constant pressure in the chamber 309. Flowing out of the chamber 309, the fuel then comes into the fuel holding section 201a of the fuel injection valve 200 through the fuel outlet 312, annular groove 201d and fuel holes 201e. When the plunger 202 is not in operation, a supply of fuel is always fully present in the fuel holding section 201a.

In operation, when the solenoid 204 of the fuel injection valve 200 is energized, the plunger 202 moves backwardly (i.e., to the right in FIG. 3) against the action of the spring 205 to open the nozzle 201c, in other words, make a communication between the fuel holding section 201a and nozzle 201c for a time $\tau$ per a period of T (FIG. 7), so that the fuel flows from the holding section 201a into the atomizing chamber 203a through the nozzle 201c for the time $\tau$ per a period of time T. In the atomizing chamber 203a, the fuel is atomized by the air supplied into the chamber 203a through the air bleed passage 105 and the fuel is injected therefrom into the fuel injection port 104 through the nozzle 203b and cylindrical guide portion 203d. At the Venturi portion 103 of the suction cylinder 101, a negative pressure is produced by the air drawn into the cylinder 101 in a degree depending upon its amount, or the velocity of the air flow, and draws the fuel-air mixture from the fuel injection port 104 into the cylinder 101, with the result that air is supplied into the atomizing chamber 203a through the air bleed passage 105 to atomize the fuel supplied into the atomizing chamber 203a.

When the current supply to the solenoid 204 is stopped, the spring 205 urges the plunger 202 toward the nozzle 201c so that the plunger 202, at the circumference of its forward end, comes into contact with a conical surface 201b to prevent the communication between the fuel holding section 201a and nozzle 201c, resulting in the prevention of the fuel supply from the former 201a to the latter 201c.

FIG. 8 shows a block diagram of a fuel control circuit 400 adapted to set the time of $\tau$ as already explained, that is, the fuel injection time for the supply system hereinabove mentioned. Numeral 401 designates an air-flow sensor adapted to give a duty-ratio conversion section 405 electric signals in accordance with the amount of the air drawn into the engine. An engine-speed sensor 402 gives the signal of the period of T, determined by the engine speed, to the duty-ratio conversion section 405 through a wave-form shaping device 403 and a frequency divider 404. Employing these signals, the duty-ratio conversion section 405 emits a pulse signal for the fuel injection to give a time of $\tau$ and a duty ratio of $\tau/T$ and this pulse signal is amplified at a power circuit 406. From the power circuit 406, the pulse signal is then given to the fuel injection valve 200 so that the latter 200 is opened. A detailed description of the construction and operation of the fuel control circuit 400 is not given here since such control circuit is disclosed in U.S. Pat. No. 3,898,964.

Figure 9:
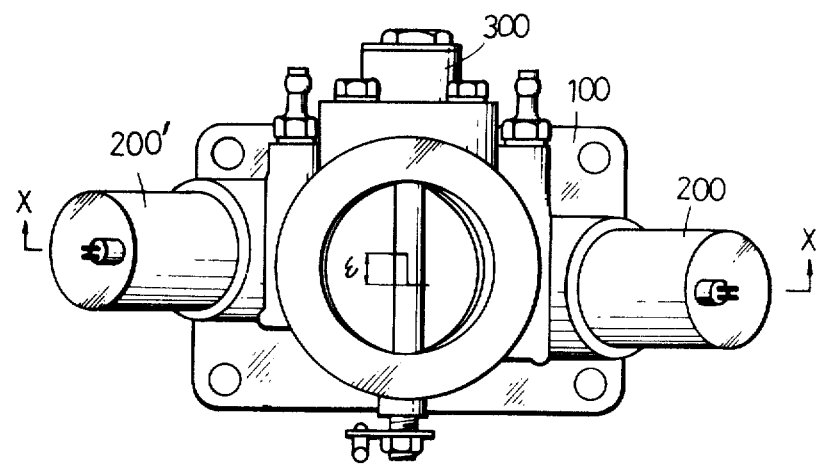
FIG. 9 is plan view of a fuel-air mixture supply system according to another embodiment of this invention.
Figure 10:
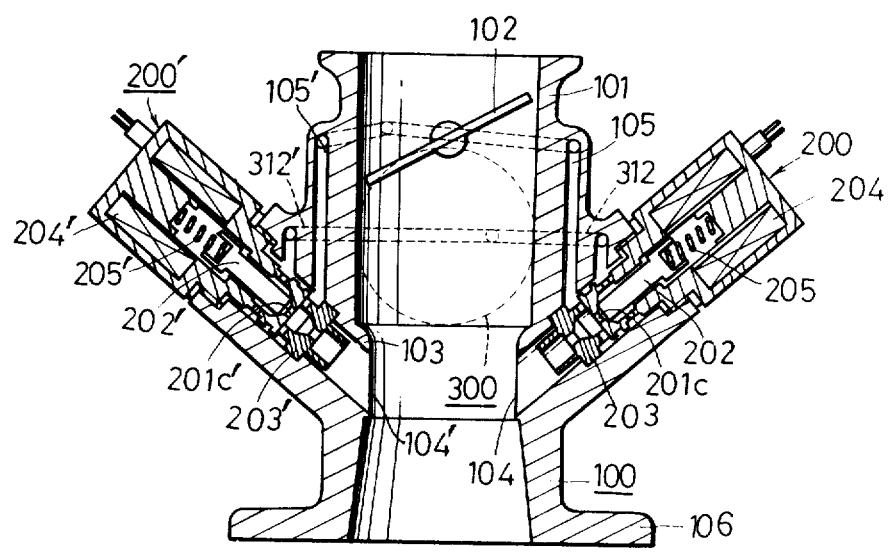
FIG. 10 is a cross sectional view of the supply system shown in FIG. 9, taken on line X—X.

Referring to FIGS. 9 and 10, there is shown a fuel-air mixture supply system according to another embodiment of this invention. This supply system has two identical fuel injection valves 200 and 200' directed substantially oppositely to each other with a suction cylinder 101 therebetween. However, it is to be noted in this embodiment that the axes of the fuel injection valves 200 and 200', when imaginarily extended in a downward direction, intersect neither the axis of the suction cylinder 101 nor each other and the two valves 200 and 200' are, as it were, eccentric by an amount of $\epsilon$ as clearly shown in FIG. 9. The presence of this eccentricity allows a desirable mixing of the fuel and air in the suction cylinder 101. The preferable range of amount of the eccentricity is from zero to nine-tenths of the inner diameter of a Venturi portion 103 similar to that in the first embodiment.

Figure 11:
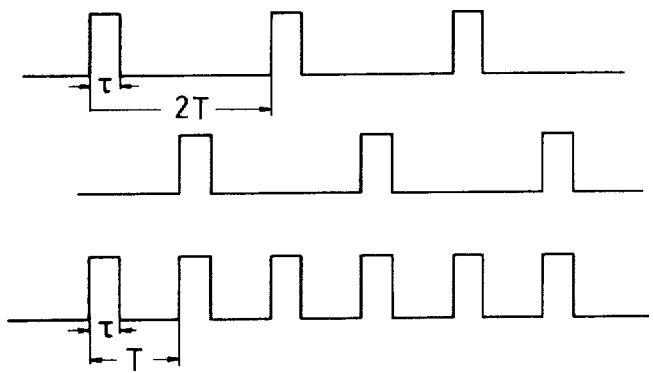
FIG. 11 shows the wave form representing the operation of a fuel injection valve of the supply system of FIG. 9.

According to the second embodiment, it is also possible, as in the first embodiment, to inject the fuel for a time of $\tau$ per a period of T by operating the fuel injection valves 200 and 200' in an alternate manner with the operation period or cycle of each injection valve being made twice that in the first embodiment, that is, 2T (FIG. 11), so that the particles of the fuel injected into the cylinder 101 can be distributed in a uniform manner therein.

Figure 12:
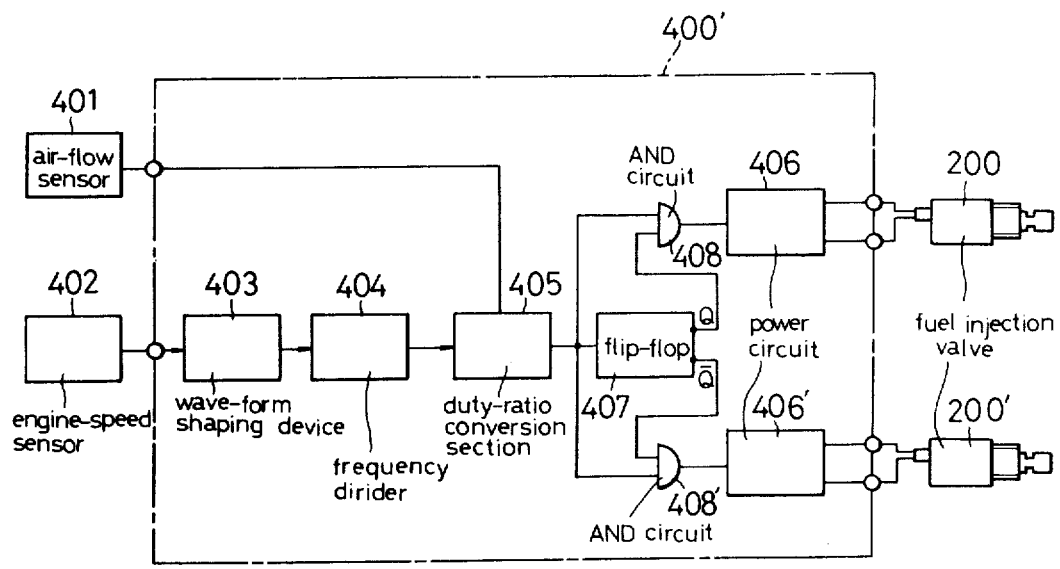
FIG. 12 is a block diagram of a fuel control circuit used for the supply system of FIG. 9.

FIG. 12 shows a block diagram of a fuel control circuit 400' used for the supply system of the second embodiment. A frequency divider 404 determines the period of T. A duty-ratio conversion section 405 is adapted to emit pulse signals with a duty ratio of $\tau/T$ to a flip-flop 407, AND circuits 408 and 408'. Outputs from the flip-flop 407 are inverted by the lowering of the pulse signals. Outputs from an output terminal Q of the flip-flop 407 will go to 0 and 1, alternately. The output level of another output terminal $\bar{Q}$ of the flip-flop 407 is contrary to that of the terminal Q. Thus, when the AND circuits 408 and 408' receive the pulse signals, the circuits 408 and 408' will be in an on condition alternately causing the power circuits 406 and 406' to emit pulse signals for the fuel injection in an alternate manner, so that the injection valves 200 and 200' inject the fuel in an alternate manner.

It is to be noted that although the Venturi portions 103 are formed below the throttle valves 10 in both of the preceding two embodiments, the supply systems are able to function with the same effects if the Venturi portions are formed above the throttle valves 102.

It will be understood that further modifications may be made in the above-described supply systems without departing from the spirit of this invention.

What we claim is:

1. A fuel-air mixture supply system for use in a fuel-injection-type internal combustion engine having a throttle valve in a suction system, said supply system comprising:

a Venturi portion on the inner surface of said suction system;

at least one fuel injection port in said Venturi portion and open into suction system;

an atomizing chamber having a nozzle and communicating with said fuel injection port through said nozzle;

a fuel injection valve adapted to inject fuel into said atomizing chamber at a predetermined pressure for a predetermined time per a predetermined period;

an air bleed passage providing a communicating passage between the portion above said throttle valve in said suction system and said atomizing chamber; and said fuel injection port, atomizing chamber and fuel injection valve are provided in pairs in an identical fashion and said fuel injection ports are substantially oppositely directed; the axes of said fuel injection ports, when extended in a downward direction, do not intersect the axis of said suction system; and each of said fuel injection valves is adapted to inject fuel in an alternate manner.

2. The invention of claim, 1 wherein each of said fuel injection valves is adapted to inject the fuel for the same time as in the use of only one fuel injection valve per the period which is twice that in the use of only one fuel injection valve.

3. The invention of claim 1 wherein said Venturi portion is formed below said throttle valve.

* * * * *